US012803138B2

(12) United States Patent
Menargues Gomez et al.

(10) Patent No.: US 12,803,138 B2
(45) Date of Patent: Nov. 17, 2026

(54) SIX-PORT ORTHOMODE JUNCTION

(71) Applicant: SWISSto 12 SA, Renens (CH)

(72) Inventors: Esteban Menargues Gomez, Préverenges (CH); Antoine Calleau, Lausanne (CH); Santiago Capdevila Cascante, Renens (CH)

(73) Assignee: SWISSto12 SA, Renens (CH)

( * ) Notice: Subject to any disclaimer, the term of this patent is extended or adjusted under 35 U.S.C. 154(b) by 66 days.

(21) Appl. No.: 19/106,969

(22) PCT Filed: Aug. 31, 2023

(86) PCT No.: PCT/IB2023/058616
§ 371 (c)(1),
(2) Date: Feb. 26, 2025

(87) PCT Pub. No.: WO2024/047573
PCT Pub. Date: Mar. 7, 2024

(65) Prior Publication Data
US 2026/0058347 A1 Feb. 26, 2026

(30) Foreign Application Priority Data
Sep. 1, 2022 (FR) ........................................ 2208770

(51) Int. Cl.
*H01H 1/16* (2006.01)
*H01P 1/161* (2006.01)
*H01Q 1/50* (2006.01)

(52) U.S. Cl.
CPC ............... *H01P 1/161* (2013.01); *H01Q 1/50* (2013.01)

(58) Field of Classification Search
CPC .................................. H01P 1/161; H01Q 1/50
See application file for complete search history.

(56) References Cited

U.S. PATENT DOCUMENTS 3,731,235 A * 5/1973 Ditullio ................. H01P 1/2131
333/135
4,052,724 A 10/1977 Takeichi et al.
(Continued)

FOREIGN PATENT DOCUMENTS

CN 109755750 B 5/2019
WO WO 2024/047573 A1 3/2024

OTHER PUBLICATIONS

Search Report from corresponding International Patent Application No. PCT/IB2023/058616, mailed Dec. 4, 2023, in 7 pages.
(Continued)

*Primary Examiner* — Quan Tra
(74) *Attorney, Agent, or Firm* — Knobbe, Martens, Olson & Bear, LLP

(57) ABSTRACT

The present invention relates to a six-port orthomode transducer (1) produced by additive manufacturing, and comprising a dual-polarization input port (10); a dual-polarization output port (11); the input port and the output port defining a main direction (100) corresponding to the direction of propagation of a signal between the input port (10) and the output port (11); a first single-polarization side port (12) extending along a first axis (120) transverse to the main direction (100); a second single-polarization side port (13) facing the first side port (12) and extending along a second axis (130) transverse to the main direction (100); a third single-polarization side port (14) extending along a third axis (140) transverse to the main direction (100); a fourth single-polarization side port (15) facing the third side port (14) and extending along a fourth axis (150) transverse to the main direction (100); said first, second, third and fourth transverse axes each forming an angle with the main direction (100) of between 15° and 75°, the six-port orthomode transducer being characterized by a high-pass filter arranged between the side ports and the output port, said high-pass
(Continued)

filter comprising at least two filtering slots (21). The present invention also relates to a transceiver antenna comprising such an orthomode transducer and a plurality of low-pass filters.

12 Claims, 5 Drawing Sheets

(56) References Cited

U.S. PATENT DOCUMENTS

| | | | | | |
|---|---|---|---|---|---|
| 4,700,154 | A * | 10/1987 | Schuegraf | H01P 1/161 333/251 |
| 5,923,229 | A * | 7/1999 | Simons | H01P 1/2131 333/135 |
| 6,046,702 | A * | 4/2000 | Curtis | H01Q 13/0258 333/135 |
| 2002/0187760 | A1 * | 12/2002 | Krishmar-Junker | H01P 1/161 333/125 |
| 2008/0280583 | A1 * | 11/2008 | Chattopadhyay | H04B 1/18 455/327 |
| 2010/0052816 | A1 * | 3/2010 | Reiche | H01P 1/161 333/137 |
| 2013/0207742 | A1 * | 8/2013 | Monte | H01P 1/161 333/126 |
| 2013/0342282 | A1 | 12/2013 | Uher | |

OTHER PUBLICATIONS

Written Opinion from corresponding International Patent Application No. PCT/IB2023/058616, mailed Dec. 4, 2023, in 5 pages.

Addamo Guiseppe, "3D Printing of a Monolithic K/Ka-Band Dual-Circular Polarization Antenna-Feeding Network," IEEE Access, IEEE, USA, vol. 9, Jun. 16, 2021, pp. 88243-88255.

* cited by examiner

SIX-PORT ORTHOMODE JUNCTION

CROSS REFERENCE

This application is a U.S. National Phase of PCT International Application No. PCT/IB2023/058616, filed Aug. 31, 2023 and published as WO 2024/047573 on Mar. 7, 2024, which claims priority to French Application No. 2208770, filed Sep. 1, 2022. The entire disclosure of each of the above-identified applications is hereby incorporated by reference.

TECHNICAL FIELD

The present invention relates to a six-port orthomode transducer suitable for additive manufacturing.

STATE OF THE ART

In the field of radio frequency transmissions, dual-polarization antennas are antennas capable of emitting as well as receiving electromagnetic waves according to two orthogonal polarizations. These antennas generally consist of a radiating element (typically of horn type) and a feed chain. This feed chain must in particular allow discrimination of the two orthogonal polarizations so as to be able to combine (in transmission), respectively separate in reception, the two signals. This discrimination can be achieved by means of a dual-polarization orthomode transducer (OMT) such as a "turnstile" junction having an input port connected to the horn and two pairs of side ports placed opposite each other, each pair allowing one of the polarizations to be isolated.

When such an antenna is additionally dual-band, i.e. capable of operating on two frequency ranges, the feed chain must also be capable of discriminating between the respective frequency ranges. This discrimination is usually carried out by means of bandpass filters placed in the feed chain.

Although the operations of separation/combination of each polarization on the one hand and of filtering of the frequencies on the other hand are quite distinct, certain orthomode transducers known in the prior art make it possible to combine the discrimination of polarizations and of frequencies in a single device. Such devices typically have six ports in total, including an input port and an output port, usually dual-polarized and arranged coaxially, as well as four side ports, usually single-polarized. Polarization discrimination is performed at the side ports, while frequency band discrimination can be performed for example using a high-pass filter connected to the output port and low-pass filters connected to the side ports.

However, the recent boom in additive manufacturing in the field of radio frequency transmissions has seen an increase in the need to improve the designs of such antennas so that they can be produced by additive manufacturing. In particular, dual-polarized antennas, and orthomode transducers in general, have relatively large cantilever sections, such as lateral waveguides or some parts of bandpass filters, making efficient and cheap additive manufacturing impossible. This is because overhanging areas need to be supported during manufacturing, and the supports must then be removed by hand, resulting in losses in both time and cost.

Document US2013/0342282 A1 describes a six-port orthomode transducer in which two pairs of rectangular-section side ports make it possible to discriminate the two orthogonal polarizations of a wave propagating in a main waveguide. The four side ports extend radially relative to the main propagation direction of the signal in the main guide, i.e. perpendicular to this main propagation direction. A low-pass filter is connected to one port of the orthomode transducer whose direction is parallel to the main propagation direction, while four high-pass filters are connected to the four side ports. In this device, the four side ports as well as a low-pass filter as described are not suitable for additive manufacturing for the reasons mentioned above.

Document G. Addamo et al., "3D Printing of a Monolithic K/Ka-Band Dual-Circular Polarization Antenna-Feeding Network," in IEEE Access, vol. 9, pp. 88243-88255, 2021 describes a six-port orthomode transducer suitable for additive manufacturing. Frequency discrimination is achieved on the one hand by a virtual filter consisting of a progressive narrowing of the internal diameter of the main waveguide and on the other hand by low-pass filters connected to the side ports. The side ports are oriented so that two pairs of side ports form with the input port, i.e. the port intended to be connected to the antenna horn, an H-plane divider. In other words, the longest side of the side port opening is aligned with the direction of propagation.

BRIEF SUMMARY OF THE INVENTION

One aim of the present invention is to provide a six-port orthomode transducer free from the limitations of those known in the prior art.

Another aim of the invention is to provide a six-port orthomode transducer suitable for additive manufacturing.

Another aim of the invention is to propose a six-port orthomode transducer capable of discriminating between two frequency bands.

According to the invention, these aims are achieved in particular by means of a six-port orthomode transducer produced by additive manufacturing, and comprising

- a dual-polarization input port;
- a dual-polarization output port;
- the input port and the output port defining a main direction corresponding to the direction of propagation of a signal between the input port and the output port;
- a first single-polarization side port extending along a first axis transverse to the main direction;
- a second single-polarization side port facing the first side port and extending along a second axis transverse to the main direction;
- a third single-polarization side port extending along a third axis transverse to the main direction;
- a fourth single-polarization side port facing the third side port and extending along a fourth axis transverse to the main direction;
- said first, second, third and fourth transverse axes each forming an angle with the main direction comprised between 15° and 75°,
- the six-port orthomode transducer being characterized by a high-pass filter provided between the side ports and the output port, said high-pass filter comprising at least two filtering slots.

The orthomode transducer may be characterized in that said high-pass filter comprises a platform extending radially from the main direction, the at least two filtering slots being provided on said platform.

The platform may comprise at least one support arch extending radially from the main direction.

In order to facilitate its additive manufacturing, the at least one support arch may have at least one cantilevered face forming an angle with the main direction of between 15° and 75°.

The orthomode transducer may be characterized in that a smaller dimension of each of the four side ports is parallel to the main direction.

The output port may comprise at least one ridge provided on an inner wall of the output port.

The platform may include a protruding impedance matching element extending in the main direction.

A diameter of the input port may be larger than a diameter of the output port.

The orthomode transducer may be characterized by a double symmetry along two mutually orthogonal planes, each of the two orthogonal planes comprising the main direction.

The above-mentioned aims are also achieved by means of an antenna for transmitting and/or receiving dual-polarized signals comprising an orthomode transducer as described above and comprising four low-pass filters, each side port being connected to one of the four low-pass filters.

Each of the four low-pass filters may include at least one inner face provided with indents.

The antenna may be characterized by a double symmetry along two mutually orthogonal planes, each of the two orthogonal planes comprising the main direction.

BRIEF DESCRIPTION OF THE FIGURES

Examples of implementations of the invention are indicated in the description illustrated by the appended figures in which.

EXAMPLE(S) OF EMBODIMENTS OF THE INVENTION

Figure 1:
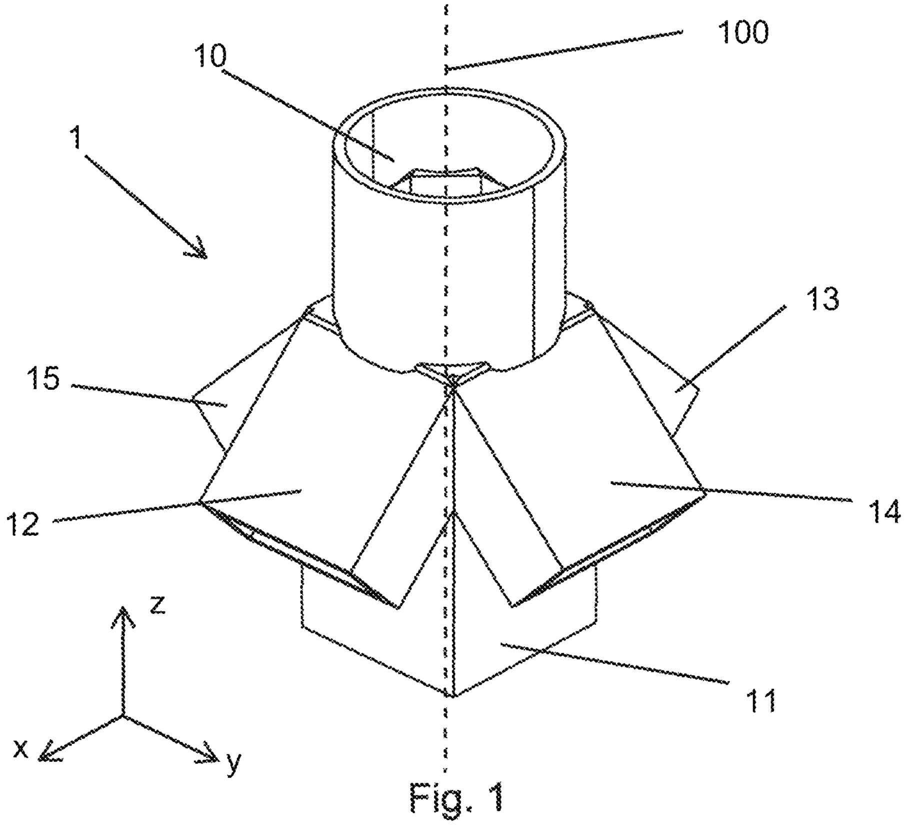
FIG. 1 illustrates a three-quarter view of a six-port orthomode transducer.
Figure 2:
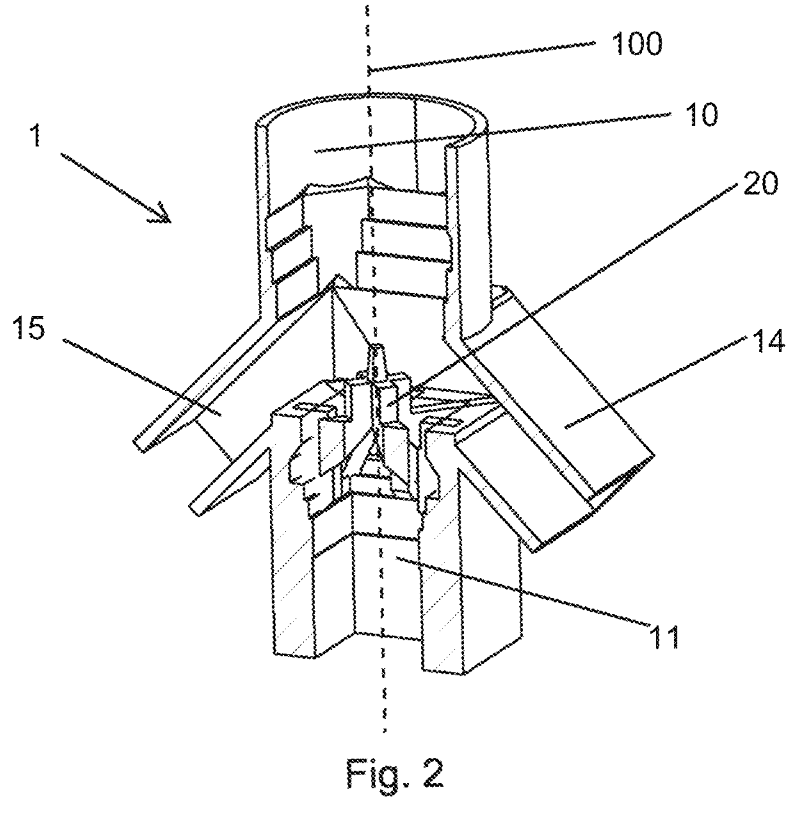
FIG. 2 illustrates a longitudinal section of a six-port orthomode transducer.

FIG. 1 illustrates an orthomode transducer 1 according to the invention comprising an input port 10 and a dual-polarization output port 11 determining a main direction 100 corresponding to the direction of propagation of a signal between the input port and the output port. Four side ports (12,13,14,15) are connected to the orthomode transducer along four axes transverse to the main direction.

In the course of the present description, it will be assumed that the orthomode transducer of the present invention is oriented as follows: the main direction of propagation between the input port 10 and the output port corresponds to the z direction which coincides with the 3D printing direction. The x and y directions lie in a plane orthogonal to the z direction and correspond to the orthogonal directions of the polarizations.

The input port 10 consists of a standard waveguide whose section can be circular, rectangular so as to receive/transmit signals with circular, elliptical or linear polarization. Generally, the section of the input port may be any geometric shape deemed suitable by those skilled in the art, including for example pentagonal, hexagonal, polygonal sections with more than six sides, but also combinations of polygon sections with curved sides. In use in a dual-polarized antenna, the input port 10 is typically connected to a waveguide or directly to a radiating element such as a horn. The output port 11 is, for its part, arranged coaxially to the input port 10 and is also dual-polarized. Similarly, the output port 11 is a waveguide whose section can be any geometric shape deemed suitable by those skilled in the art, including for example pentagonal, hexagonal, polygonal sections with more than six sides, but also combinations of polygon sections with curved sides.

Between the input 10 and output 11 ports, the first side port 12 extends along a first axis 120 transverse to the main direction 100 and faces the second side port 13 which extends along a second axis 130 also transverse to the main direction 100. The first and second ports allow the separation/combination of signals according to a first polarization P1. The third side port 14 extends along a third axis 140 transverse to the main direction 100 and facing the fourth side port 15 which extends along a fourth axis 150 transverse to the main direction 100. The third and fourth ports allow the separation/combination of signals according to a second polarization P2. Each of the four side ports is thus single polarized.

In an embodiment illustrated in FIG. 1, the side ports (12, 13, 14, 15) are of rectangular section with the smallest side of the rectangular sections being aligned with the main direction 100, so that the combination of the input port 10 with a pair of opposite side ports (i.e. corresponding to the same polarization) forms an E-plane divider/combiner. The direction of the electric field of a wave propagated in the two side ports corresponding to the same polarization is therefore opposite.

Figure 3:
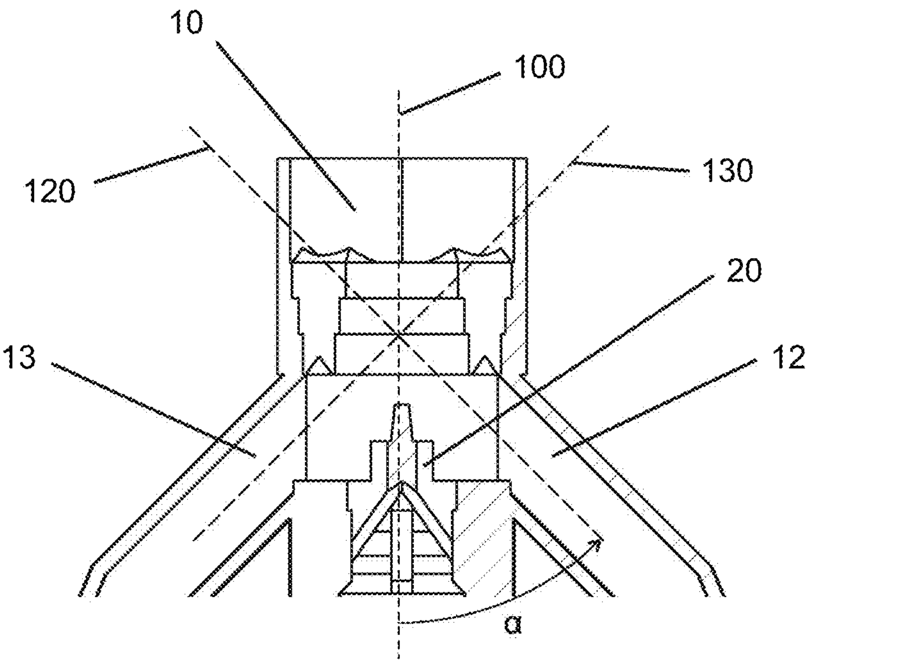
FIG. 3 illustrates a longitudinal section of a six-port orthomode transducer.

As illustrated in FIG. 3, each of the first, second, third and fourth axes (120,130,140,150) forms an angle with the main direction 100 comprised between 15° and 75°, preferably between 35° and 55°. This inclination relative to the z direction makes additive manufacturing of side ports possible. Indeed, the z-axis generally coincides with the 3D printing direction, so the inclination of the side ports relative to this direction helps reduce the physical constraints exerted by the force of gravity on these side ports and therefore helps reduce or even eliminate the need for supports during manufacturing. The inclination of the side ports can also make it possible to increase the compactness of the orthomode transducer by limiting its external volume.

Figure 4:
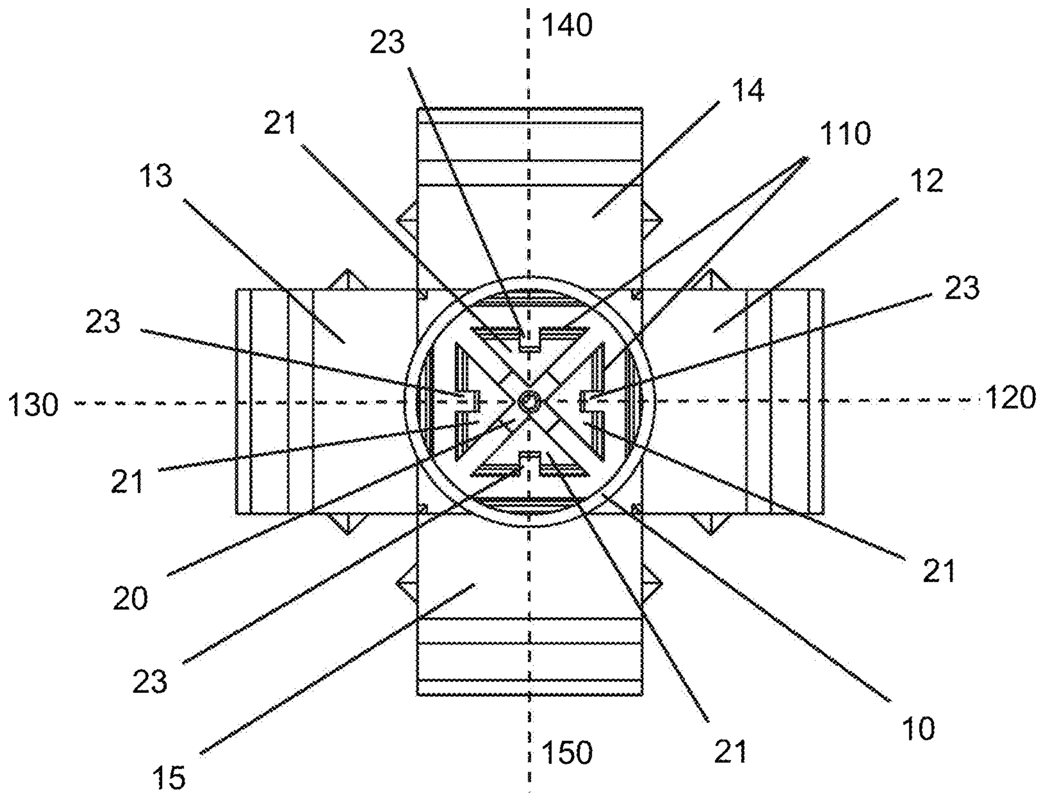
FIG. 4 illustrates a top view of a six-port orthomode transducer including a filtering platform.

In an embodiment illustrated in FIG. 4, the arrangement of the side ports (12, 13, 14, 15) as well as the sections of the input 10 and output 11 ports are such that the entire orthomode transducer 1 according to the invention has a double planar symmetry along two mutually orthogonal planes, one of these two planes of symmetry comprising the first and second axes (120, 130) as well as the main direction 100, and the other of these planes of symmetry comprising the third and fourth axes (140, 150) as well as the main direction 100.

The orthomode transducer 1 of the present invention is provided with a high-pass filter provided between the side ports and the output port 11. This high-pass filter comprises at least two filtering slots 21 for rejecting low frequencies so that only high frequencies can pass through the output port 11.

In the context of the present invention, the terms "high frequency" and "low frequency" may correspond to different ranges of values depending on the embodiment of the invention. Indeed, the present invention can be implemented in different devices intended for various frequency bands depending on their applications. By way of example, the present invention may typically be used in devices intended for the X, Ku, Ka, QV, Ku/ka, and/or Ka/QV bands.

In X-band, low frequencies are typically comprised between 7.25 GHz and 7.75 GHz and high frequencies between 7.9 GHz and 8.4 GHz.

In Ku band, low frequencies are typically comprised between 10.7 GHz and 12.75 GHz and high frequencies between 13.25 GHz and 4.5 GHz, or sub-portions of these particular bands.

In Ka band, low frequencies are typically comprised between 17.3 GHz and 21.2 GHz and high frequencies between 27 GHz and 31 GHz, or sub-portions of these particular bands.

In the QV band, low frequencies are typically comprised between 37.5 GHz and 42.5 GHz and high frequencies between 42.5 GHz and 52.5 GHz, or sub-portions of these particular bands.

In Ku/Ka band, low frequencies are typically comprised between 10.7 GHz and 12.75 GHz and high frequencies between 13.25 GHz and 21 GHz, or sub-portions of these particular bands; alternatively, or complementarily, low frequencies are typically comprised between 13.25 GHz and 21.2 GHz and high frequencies between 13.25 GHz and 21.2 GHz and high frequencies between 27 GHz and 31 GHz or sub-portions of these particular bands.

In Ka/QV band, low frequencies are typically comprised between 27 GHz and 42.5 GHz and high frequencies between 42.5 GHz and 52.5 GHz, or sub-portions of these particular bands.

In one embodiment, the output port 11 has a cross-section with a diameter smaller than the diameter of the cross-section of the input port 10, so that a portion of the frequency band of the input port corresponds to the region below the cut-off frequency of the output port. This reduction in diameter therefore allows for additional "virtual" filtering to that of the high-pass filter.

As to the low frequencies, they are propagated in the side ports (12,13,14,15) which can themselves be connected to low-pass filters in order to reject the high frequencies.

In a preferred embodiment, the high-pass filter comprises a platform 20 in which the filtering slots 21 are provided. The platform 20 extends radially around the main direction. This platform is illustrated in FIG. 3 and includes an upper surface facing the input port 10 and a lower surface facing the output port 11. Preferably, the upper surface of the platform is perpendicular to the main direction 100.

The filtering slots 21 can be formed by the platform 20 on the one hand and the internal walls of the output port 11 on the other hand. Alternatively, or complementarily, the filtering slots 21 may be formed entirely by the platform 20 in the sense that each side of the slots is formed by a section of the platform.

In the embodiment illustrated in FIG. 4, four triangular filtering slots 21 are formed by the platform 20 on the one hand and the internal walls 110 of the output port 11. The platform comprises four arms extending from the main direction 100 towards the internal walls 110 of the output port 11.

Figure 5A:
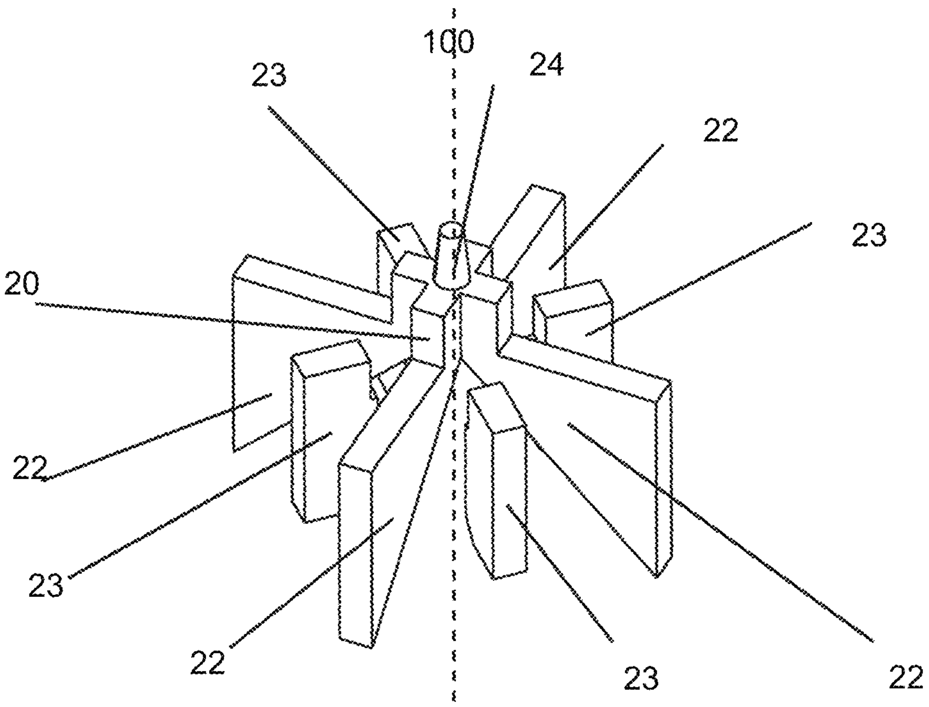
FIG. 5*a* illustrates a filtering platform suitable for additive manufacturing.
Figure 5B:
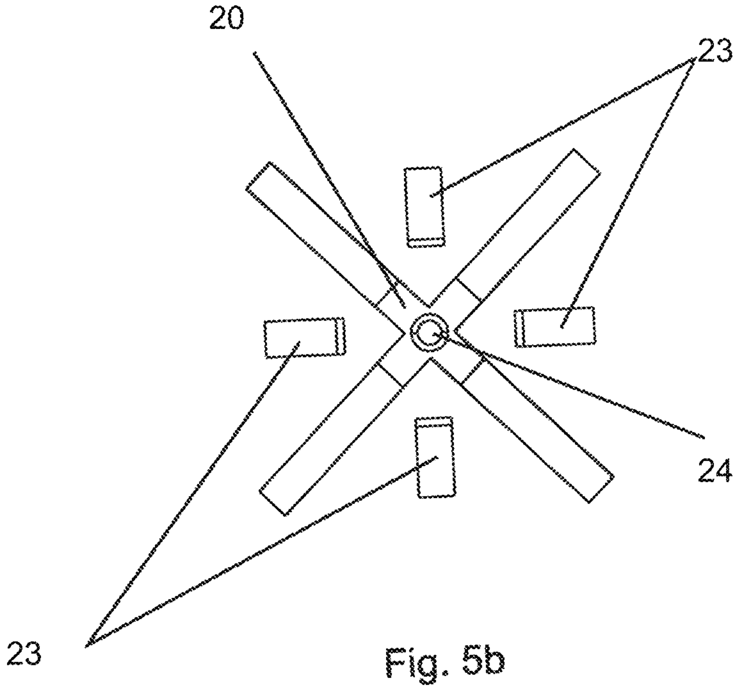
FIG. 5*b* illustrates a top view of a filtering platform suitable for additive manufacturing.

The platform 20 may comprise at least one support arch 22 so as to reinforce the stability of the platform during additive manufacturing and/or during use of the orthomode transducer. As illustrated in FIG. 5*a*, the platform 20 may comprise several support arches 22 meeting at the center of the platform at the main direction.

Figure 6:
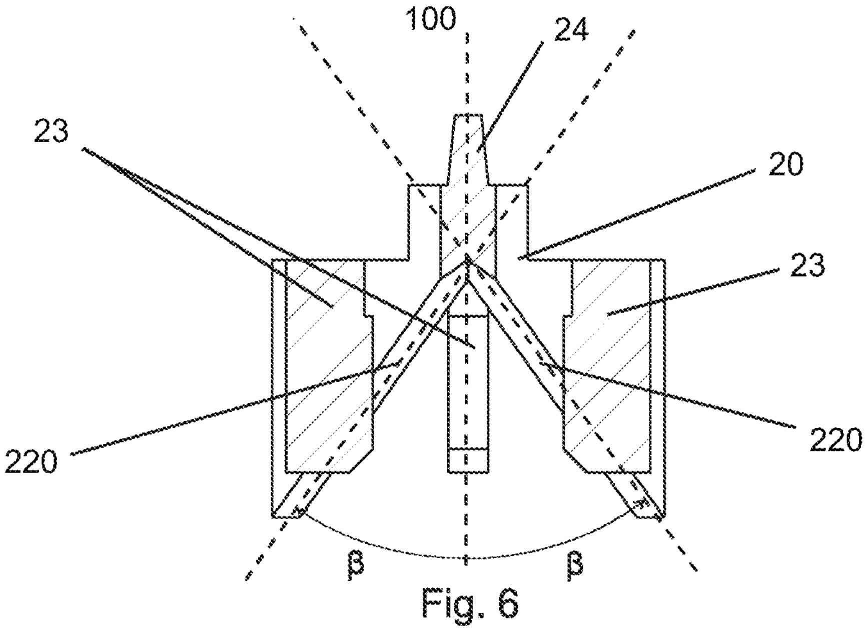
FIG. 6 illustrates a longitudinal section of a filtering platform suitable for additive manufacturing.

In order to facilitate the additive manufacturing of the platform 20 and of the support arches 22, the cantilevered faces 220 of the support arches relative to the z direction form an angle REF with the axis (z) advantageously comprised between 15° and 75°, preferably between 35° and 55°. FIG. 6 illustrates a sectional view of the platform in which two support arches 220 form an angle β with the main direction 100. As with side ports, the optimal inclination in terms of additive manufacturing is around 45°. However, for reasons related for example to the internal geometry of the orthomode transducer, inclinations of the cantilever faces comprised between 15° and 75° may also be relevant.

In one embodiment, ridges 23 parallel to the main direction may be provided on the inner surface of the output port 11. These ridges make it possible, for example, to increase the width of the frequency band and/or to adapt the impedance of the output port 11. As illustrated in FIG. 4, the coupling slots of the high-pass filter may divide the output port into a plurality of waveguides, on an internal wall of which a ridge 23 may be provided. The platform 20 can for example divide the output port 11 into four waveguides of triangular sections, one side of each section corresponding to the side determined by an internal wall 110 of the output port being provided with a ridge 23.

The platform 20 may also comprise a protruding impedance matching element 24. As illustrated in FIG. 5*a*, this protruding element can extend in the main direction 100 from the platform 20, the platform thus being able to serve as a support for the protruding element during additive manufacturing.

The orthomode transducer 1 is typically used in the feed chain of a radio frequency antenna further comprising an antenna horn connected to the input port 11. Such an antenna also usually includes low-pass filters 30 connected to the side ports (12,13,14,15).

Figure 7:
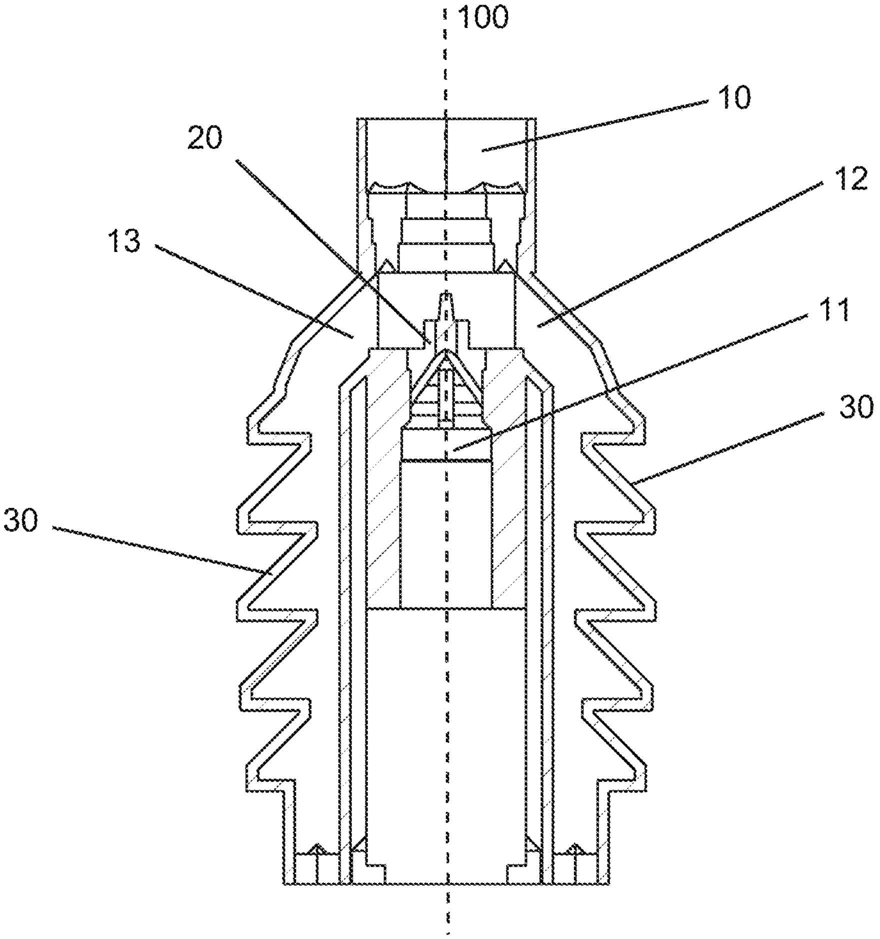
FIG. 7 illustrates a side section of a dual-polarization diplexer comprising a six-port orthomode transducer and side filters notched on one face.

FIG. 7 illustrates in section an embodiment in which each side port is connected to a low-pass filter 30, for example a low-pass filter crenellated on a side wall. Each of the low-pass filters extends along the main direction 100. The filters are advantageously symmetrical along the two planes of symmetry mentioned above, i.e. along a plane comprising the main direction 100 as well as the first and second transverse axes (120,130), and along another plane comprising the main direction 100 as well as the third and fourth transverse axes (140,150). The orthomode transducer and low-pass filters assembly thus maintains a double planar symmetry.

Figure 8:
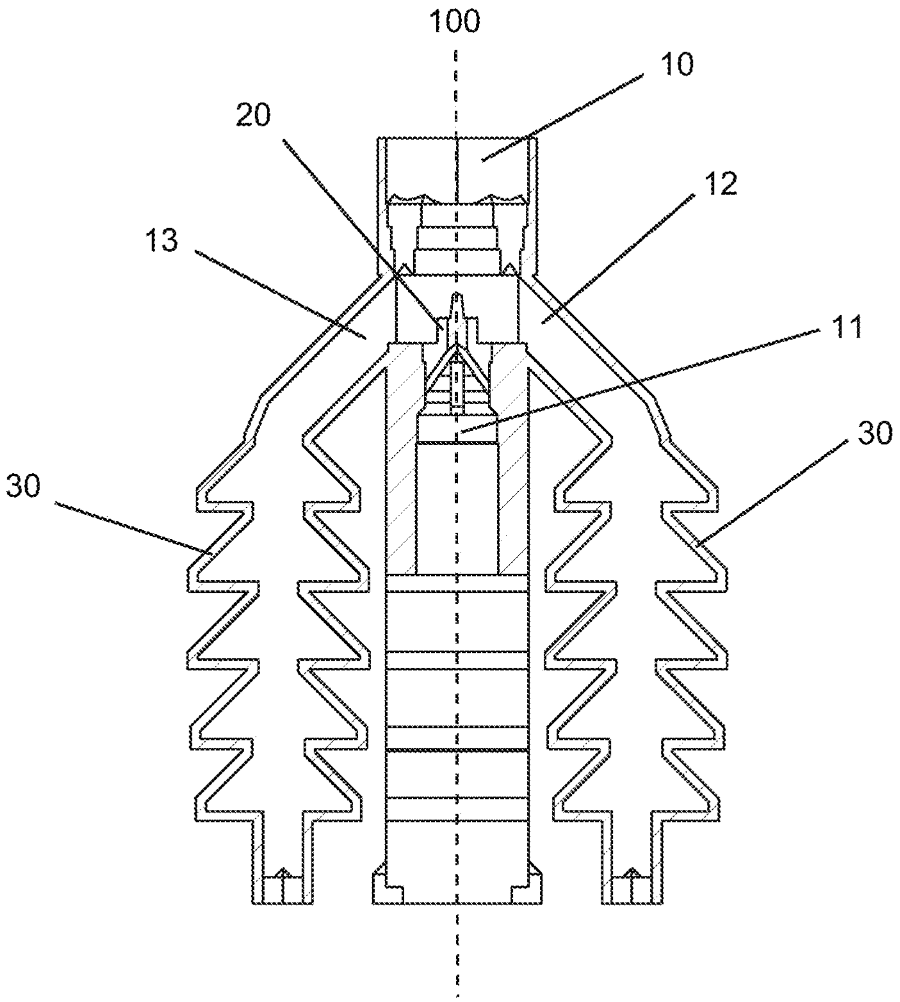
FIG. 8 illustrates a side section of a dual-polarization diplexer comprising a six-port orthomode transducer and side filters notched on two-sides.

FIG. 8 illustrates an embodiment in which the low-pass filters 30 connected to the side ports have two crenellated internal walls. These filters 30 also extend along the main direction 100. Again, a double symmetry of the orthomode transducer and low-pass filters assembly can be achieved.

In a feed chain comprising an orthomode transducer according to the present invention as well as low-pass filters as described above, the two pairs of low-pass filters corresponding to the first and second polarization can then be recombined using two single-band combiners. In such a feed chain, the output port can also be connected to a single-band orthomode transducer. Advantageously, the single-band combiners and the single-band orthomode transducer are also arranged so as to preserve the double symmetry of the feed chain.

REFERENCE NUMBERS USED IN THE FIGURES

1 Orthomode transducer
10 Input port
100 Main direction
11 Output port
110 Internal wall of the output port
12 First side port
13 Second side port
14 Third side port
15 Fourth side port
120 First transverse axis
130 Second transverse axis
140 Third transverse axis
150 Fourth transverse axis
20 Platform
21 Filtering slot
22 Support arch
220 Cantilevered face
23 Ridge
24 Protruding impedance matching element
30 Low pass filter

The invention claimed is:

1. A six-port orthomode transducer produced by additive manufacturing, and comprising a dual-polarization input port;

a dual-polarization output port;

the input port and the output port defining a main direction corresponding to the direction of propagation of a signal between the input port and the output port;

a first single-polarization side port extending along a first axis transverse to the main direction;

a second single-polarization side port facing the first side port and extending along a second axis transverse to the main direction;

a third single-polarization side port extending along a third axis transverse to the main direction;

a fourth single-polarization side port opposite the third side port and extending along a fourth axis transverse to the main direction;

said first, second, third and fourth transverse axes each forming an angle with the main direction comprised between 15° and 75°, wherein the six-port orthomode comprises a high-pass filter arranged between the side ports and the output port, said high-pass filter comprising at least two filtering slots.

2. Orthomode transducer according to claim 1, wherein said high-pass filter comprises a platform extending radially from the main direction, the at least two filtering slots being arranged on said platform.

3. Orthomode transducer according to claim 2, wherein said platform comprises at least one support arch extending radially from the main direction.

4. Orthomode transducer according to claim 3, wherein the at least one support arch has at least one cantilever face forming an angle with the main direction comprised between 15° and 75°.

5. Orthomode transducer according to claim 1, wherein a smaller dimension of each of the four side ports is parallel to the main direction.

6. Orthomode transducer according to claim 1, wherein the output port comprises at least one ridge provided on an internal wall of the output port.

7. Orthomode transducer according to claim 2, wherein the platform comprises a projecting impedance matching element.

8. Orthomode transducer according to claim 1, wherein a diameter of the input port being greater than a diameter of the output port.

9. Orthomode transducer according to claim 1, wherein the orthomode transducer has a double symmetry along two planes orthogonal to each other, each of the two orthogonal planes comprising the main direction.

10. Antenna for transmitting and/or receiving dual-polarized signals comprising an orthomode transducer according to claim 1 and comprising four low-pass filters, each side port being connected to one of the four low-pass filters.

11. Antenna according to claim 10, wherein each of the four low-pass filters comprises at least one internal face provided with indents.

12. Antenna according to claim 10, wherein the antenna has a double symmetry along two planes orthogonal to each other, each of the two orthogonal planes comprising the main direction.

* * * * *